WILLIAM PARRISH.
Improvement in Gang-Plows.
No. 115,980.                      Patented June 13, 1871.
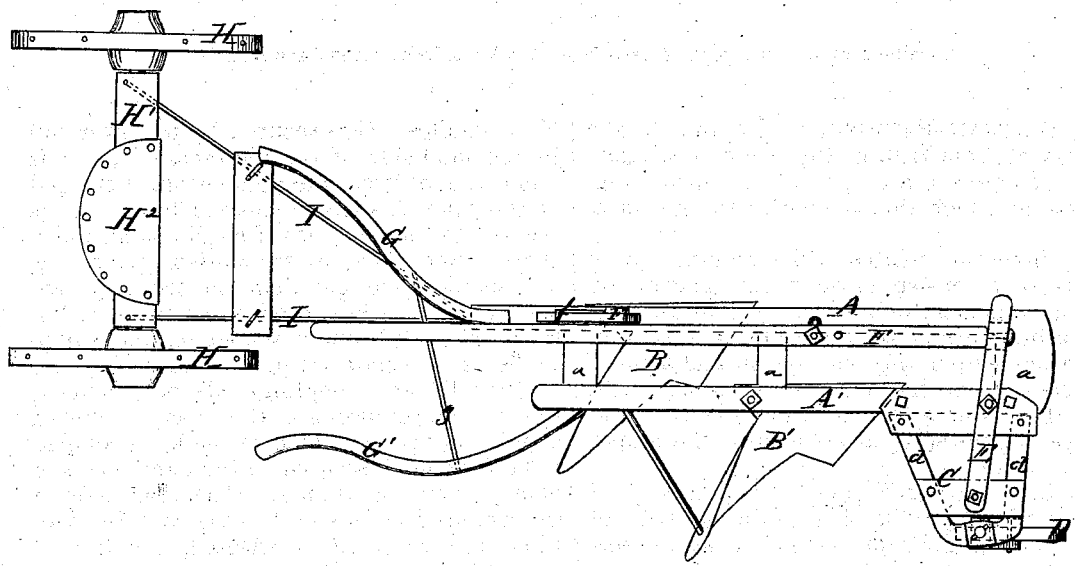
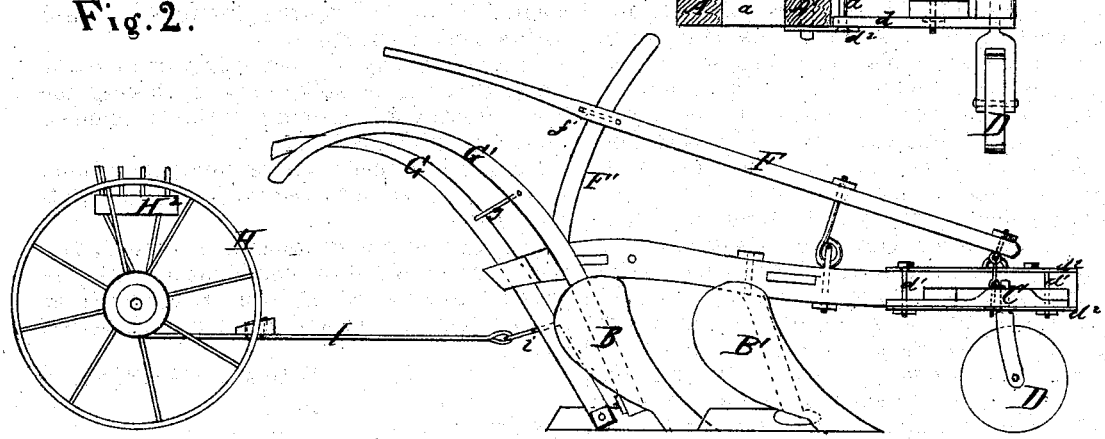
Witnesses.
Villette Anderson.
J. B. Curtis.
Inventor.
W. Parrish,
Chipman Hosmer & Co.
Attys

UNITED STATES PATENT OFFICE.

WILLIAM PARRISH, OF DAYTON, OREGON.

IMPROVEMENT IN GANG-PLOWS.

Specification forming part of Letters Patent No. 115,980, dated June 13, 1871.

I, WILLIAM PARRISH, of Dayton, in the county of Yam Hill, in the State of Oregon, have invented certain Improvements in Gang-Plows, of which the following is a specification:

My invention relates to the manufacture of plows; and consists in the novel construction and arrangement of a lever, yoke, and frame, operating a caster on the right-hand side of the front end of the plow-beam, and a sulky attachment for the driver's use, so arranged that the caster attachment shall serve to aid in keeping the sulky attachment in the proper line of draft.

In the drawing, Figure 1 is a plan view of improved plow. Fig. 2 is a side elevation of the same. Fig. 3 represents a transverse section of plow behind the caster-wheel.

The plow is composed of the parallel beams A A', united by cross-ties $a$ $a$ $a$. B B' are the plowshares, one of which is secured to each of said beams B', being placed forward of B. C is the yoke for supporting the caster-wheel D, the spindle of which turns in the outer side thereof. The ends of the bars $d$ $d$ composing said yoke are pierced, and the same hung on vertical pins $d^1$ $d^1$, fixed between plates $d^2$ $d^2$, which are secured to the upper and under sides of the beam A'. E is a lever-arm, fulcrumed on the plow-frame, which it crosses. One end is attached to the yoke C, and the other provided with a slot to receive the small end of a lever, F, fulcrumed by an eyebolt, $e$, to the beam A. F is a curved bar, pivoted within a slot formed in the beam A near its rear end. The lever F is provided with a loop, $f$, to pass around said bar, which is for the purpose of guiding and keeping the lever in place. A number of holes may be cut in the bar F', and, with a pin, employed to retain the lever at any desired height. By raising or lowering the said lever the movement is communicated to the caster-wheel. G G' represent the plow-handles. G is secured by its lower end to the land-side of the plowshare B, and is tenoned and fitted into a notch cut in the end of the beam A so as to make it firmer. A' is secured to the mold-board of the same plowshare. Both handles are united by a rod, $g$, and should be longer than the ordinary handles and properly curved, so as to be within reach of the plowman seated on the sulky. The sulky is composed of the wheels H, axle $H^1$, seat $H^2$, and coupling rods or hounds I, the latter terminating at their forward united ends in an eye, by which the sulky is coupled to an eyebolt, $i$, secured to the handle G at a point below the beam A. The rear ends of the hounds I are secured to the axle $H^1$, and, when the coupling is effected, the line of draft of the sulky is brought nearer that of the plow, and it is, therefore, easier to be drawn.

Inasmuch as this sulky is required to support the weight of the plowman only, it may be lightly constructed.

The mode of coupling allows the sulky to turn from side to side, adapt itself to surface inequalities, and allows the plow to be reversed within convenient space.

The plows may be used singly or in pairs, making a gang or sulky plow, by taking the beams apart and removing all the mechanism connected with the beam A'.

Having described my invention, what I claim as new, and desire to secure by Letters Patent, is—

The sulky attachment herein described, connected as specified, in combination with the yoke C, caster-wheel D, arms E F, and lever F', substantially as and for the purpose set forth.

WILLIAM PARRISH.

Witnesses:
  C. B. TALBOT,
  M. ROSENDORF.